United States Patent
Zhang et al.

(10) Patent No.: US 11,271,209 B2
(45) Date of Patent: Mar. 8, 2022

(54) PREPARATION METHOD OF CROSSLINKING-TYPE AQUEOUS BINDER FOR LITHIUM-ION BATTERIES INCORPORATING SLURRY COATING AND DRYING PROCESS

(71) Applicant: GUANGZHOU INSTITUTE OF ENERGY CONVERSION, CHINESE ACADEMY OF SCIENCES, Guangzhou (CN)

(72) Inventors: Lingzhi Zhang, Guangzhou (CN); Jing Su, Guangzhou (CN)

(73) Assignee: GUANGZHOU INSTITUTE OF ENERGY CONVERSION, CHINESE ACADEMY OF SCIENCES, Guangzhou (CN)

( * ) Notice: Subject to any disclaimer, the term of this patent is extended or adjusted under 35 U.S.C. 154(b) by 295 days.

(21) Appl. No.: 16/490,905

(22) PCT Filed: Nov. 1, 2017

(86) PCT No.: PCT/CN2017/109004
§ 371 (c)(1),
(2) Date: Sep. 4, 2019

(87) PCT Pub. No.: WO2019/061675
PCT Pub. Date: Apr. 4, 2019

(65) Prior Publication Data
US 2020/0014029 A1    Jan. 9, 2020

(30) Foreign Application Priority Data

Sep. 30, 2017 (CN) .......................... 201710923090.5

(51) Int. Cl.
*H01B 1/20* (2006.01)
*H01M 4/62* (2006.01)
(Continued)

(52) U.S. Cl.
CPC ............. *H01M 4/622* (2013.01); *C08L 87/00* (2013.01); *H01B 1/20* (2013.01); *H01M 4/131* (2013.01);
(Continued)

(58) Field of Classification Search
CPC ........ H01B 1/20; H01M 4/621; H01M 4/622; C09J 151/02; C08L 87/00
See application file for complete search history.

(56) References Cited

U.S. PATENT DOCUMENTS

| 4,557,976 A | * | 12/1985 | Geist | .................. C08G 59/4042 |
|---|---|---|---|---|
|  |  |  |  | 204/500 |
| 2016/0118664 A1 | * | 4/2016 | Sonobe | .................. H01M 4/62 |
|  |  |  |  | 429/217 |
| 2019/0225792 A1 | * | 7/2019 | Zhang | .................. C09J 151/00 |

FOREIGN PATENT DOCUMENTS

| CN | 102156384 A | * | 8/2011 |
| CN | 105914377 |  * | 8/2016 |

(Continued)

OTHER PUBLICATIONS

English language translation of PCT/ISA/237 (mailed Jul. 6, 2018).*

*Primary Examiner* — Mark Kopec
(74) *Attorney, Agent, or Firm* — Bayramoglu Law Offices LLC

(57) ABSTRACT

A preparation method of a crosslinking-type aqueous binder for lithium-ion batteries. An organic carboxylic group-, amino group- or hydroxyl group-containing hydrophilic polymer, and a hydroxyl group-, amine group- or carboxyl group-containing water-soluble small-molecule crosslinker, both serve as starting materials of the aqueous binder, and can be crosslinked by esterification or amidation under coating and drying conditions of lithium-ion battery electrode slurry. The preparation method of the crosslinking-type aqueous binder is simple, without the need of modify-
(Continued)

ing the current process or conditions for lithium-ion battery manufacture. The obtained electrodes have excellent binding capacity, flexibility, and elasticity.

3 Claims, 5 Drawing Sheets

(51) Int. Cl.
*C08L 87/00* (2006.01)
*H01M 4/131* (2010.01)
*H01M 4/133* (2010.01)
*H01M 10/0525* (2010.01)
*H01M 4/02* (2006.01)

(52) U.S. Cl.
CPC ....... *H01M 4/133* (2013.01); *H01M 10/0525* (2013.01); *C08L 2203/20* (2013.01); *C08L 2312/00* (2013.01); *H01M 2004/027* (2013.01); *H01M 2004/028* (2013.01)

(56) References Cited

FOREIGN PATENT DOCUMENTS

WO    WO 2016/051811 A1 * 4/2016
WO    WO 2018/235722 A1 * 6/2018

* cited by examiner

PREPARATION METHOD OF CROSSLINKING-TYPE AQUEOUS BINDER FOR LITHIUM-ION BATTERIES INCORPORATING SLURRY COATING AND DRYING PROCESS

CROSS REFERENCE TO THE RELATED APPLICATIONS

This application is the national phase entry of International Application No. PCT/CN2017/109004, filed on Nov. 1, 2017, which is based upon and claims priority to Chinese Patent Application No. 201710923090.5, filed on Sep. 30, 2017, the entire contents of which are incorporated herein by reference.

TECHNICAL FIELD

The present invention relates to the technical field of lithium-ion batteries, and particularly relates to a preparation method of a crosslinking-type aqueous binder for lithium-ion batteries incorporating slurry coating and drying process.

BACKGROUND

As an important non-active material in lithium-ion batteries, the performance of a binder directly affects electrochemical performance of the battery. In addition to the binding capability, a binder should have sufficient elasticity that prevents the electrode from swelling and breaking off from the current collector due to volume expansion and contraction during charging and discharging, facilitates electron and ion transportation to reduce the impedance between the current collector and the electrode materials. In large-scale production of the lithium-ion battery industry, polyvinylidene fluoride (PVDF) has been widely used as a binder and an organic solvent N-methylpyrrolidone (NMP) as a dispersant. However, PVDF has disadvantages such as poor conductivity for electrons and ions, relatively high requirement of the environmental humidity, high energy consumption, high production cost and insufficient flexibility. Accordingly, exploring a novel green binder to replace PVDF has become an important trend in the development of lithium-ion battery binders.

Aqueous binders are one important trend in the development of binders for lithium-ion batteries. Aqueous binders such as styrene-butadiene rubber (SBR)/sodium carboxymethyl cellulose (CMC) and polyacrylates have already been used in large-scale commercial applications; however, these binders are poor in their binding strengths, electrode flatness, and their capacity of preventing the electrode swelling, thus their applications are somewhat limited. Chinese patent application 2016105083512 discloses a multi-functionally modified polymer binder for lithium-ion batteries, which is a aqueous binder prepared by a free radical graft copolymerization or a Michael addition reaction, with a biomass polymer or a synthetic polymer as a substrate, and a hydrophilic monomer and a lipophilic monomer as functionally modifying monomers, can improve uniformity and flatness during the formation of films from electrode slurry. Chinese patent application 2016105041083 discloses a modified polyvinyl alcohol polymer, which is a aqueous binder with high water solubility and prepared by introducing acrylic monomers which provide high water solubility, acrylonitrile monomers which provide high binding and electrochemical properties, or acrylamide monomers which provide high flexibility, to the PVA molecules by a Michael addition reaction. However, these binders have deficiency in preventing the electrode swelling, especially for silicon anodes with significant size effects.

Polymers with crosslinked structures have high cohesive energy, which results in higher binding strength and elasticity, and effective prevention of electrode swelling. Thus, to develop crosslinking-type aqueous binders for lithium-ion batteries in order to improve electrode binding property and elasticity, further improve battery performance, and reduce production cost, is currently a hot topic. CN 104356979 B discloses a polyacrylates aqueous binder for electrode materials of lithium-ion batteries and the preparation method thereof. The binder is prepared by the polymerization of unsaturated monomers and crosslinking, and the crosslinked polymer binder is then applied in a lithium-ion battery; the binder is deficient in binding strength, dispersibility and elasticity, and it is necessary to control the crosslinking degree for realizing its binding function which results in a certain difficulty in the synthesis process. Therefore, this binder is currently not used on a large scale.

SUMMARY

One object of the present invention is to provide a preparation method of a crosslinking-type aqueous binder for lithium-ion batteries, wherein an organic carboxylic group-, amino group- or hydroxyl group-containing hydrophilic polymer and a hydroxyl group-, amine group- or carboxyl group-containing water-soluble small-molecule crosslinker serve as starting materials of the aqueous binder, and can be crosslinked by esterification or amidation under coating and drying conditions of lithium-ion battery electrode slurry. The preparation process is simple while no additional processing conditions are required. The obtained electrodes have excellent binding capacity, flexibility and elasticity, and thus can solve the prior art problems such as poor binding strength between the electrode active materials, the conductive agents and the current collector, and deficient elasticity for preventing the lithium-ion battery from swelling and breaking off due to volume expansion and contraction during charging and discharging.

The present invention is realized by the following technical solutions:

A preparation method of a crosslinking-type aqueous binder for lithium-ion batteries, wherein an organic carboxylic group-, amino group- or hydroxyl group-containing hydrophilic polymer, and a hydroxyl group-, amine group- or carboxyl group-containing water-soluble small-molecule crosslinker, both serve as starting materials of the aqueous binder, and can be crosslinked by esterification or amidation under coating and drying conditions of lithium-ion battery electrode slurry; the organic carboxylic group-, amino group- or hydroxyl group-containing hydrophilic polymer has a molecular weight of 70000-1000000, a solids content of 1-50 wt % and a viscosity of 1-50000 mPa·s; the organic carboxylic group-containing hydrophilic polymer is prepared by a free radical graft copolymerization or a Michael addition reaction of an acrylic monomer and the hydroxyl group-containing hydrophilic polymer; the hydroxyl group-containing hydrophilic polymer is one or more selected from arabic gum, cyclodextrin, cellulose derivative, xanthan gum, pectin, gelatin, starch, sesbania gum, polyvinyl alcohol, polyethylene glycol and polyhydroxy polybutadiene; the amino group-containing hydrophilic polymer is one or more selected from arabic gum, chitosan and its derivatives, linear polyethyleneimine and branched polyethyleneimine; the method comprises the following steps:

(1) dissolving the organic carboxylic group-, amino group- or hydroxyl group-containing hydrophilic polymer in deionized water, and thoroughly stirring under a protective gas atmosphere for 0.5-2.5 hours to remove oxygen and obtain a uniform and well-dispersed solution; a stirring rate is 100-500 rpm;

(2) adding the hydroxyl group-, amine group- or carboxyl group-containing water-soluble small-molecule crosslinker to the solution prepared in step (1), thoroughly stirring to obtain a uniform mixed solution; a molar ratio of the hydroxyl group-, amine group- or carboxyl group-containing water-soluble small-molecule crosslinker and the organic carboxylic group-, amino group- or hydroxyl group-containing hydrophilic polymer is 0.01:10 to 1:10;

(3) initiating a crosslinking reaction in the mixed solution prepared in step (2) at 90-130 ° C. to obtain the binder.

The organic carboxylic group-containing hydrophilic polymer is prepared by a free radical graft copolymerization or a Michael addition reaction of an acrylic monomer and the hydroxyl group-containing hydrophilic polymer. The free radical graft copolymerization refers to a free radical polymerization/copolymerization grafting reaction of the hydroxyl group-containing hydrophilic polymer and the acrylic monomer, which is initiated by an initiator; the initiator is selected from $(NH_4)_2S_2O_8$, $Na_2S_2O_8$, $K_2S_2O_8$, $(NH_4)_2S_2O_8/NaHSO_3$, $(NH_4)_2S_2O_8/Na_2SO_3$, $Na_2S_2O_8/NaHSO_3$, $Na_2S_2O_8/Na_2SO_3$, $K_2S_2O_8/NaHSO_3$, $K_2S_2O_8/Na_2SO_3$, $Ce(NH_4)_2(NO_3)_6$, and 2,2'-azobis[2-methylpropionamidine] dihydrochloride; an amount of the initiator is 0.01-5 wt % of a total weight of the monomer. The Michael addition reaction refers to a Michael addition reaction of the hydroxyl group-containing hydrophilic polymer and the acrylic monomer through a base catalyst; the base catalyst is one or more selected from LiOH, NaOH, LiOH/carbamide and NaOH/carbamide; an amount of the base catalyst is 0.01-5 wt % of the total weight of the monomer.

The hydroxyl group-containing water-soluble small-molecule crosslinker is at least one of the following monomers: a saturated diol having a carbon number of 2 or more, a saturated polyol having a carbon number of 3 or more, a saturated dihydroxyalkylamine $NH-(C_mH_{2m}-OH)_2$, and a saturated polyhydroxyalkylamine $N-(C_{m'}H_{2m'}-OH)_3$, wherein m≥1 and m'≥1.

The amine group-containing water-soluble small-molecule crosslinker is at least one of the following monomers: a saturated diamine $C_nH_{2n}(NH_2)_2$ and a saturated polyamine $C_nH_{2n'+2-x}(NH_2)_x$, wherein n≥2, n'≥3, and x≥3.

The carboxyl group-containing water-soluble small-molecule crosslinker is at least one of the following monomers: a saturated diacid, and a saturated polyacid having a carbon number of 3 or more.

Preferably, in step (1), the protective gas is nitrogen gas and/or argon gas; the stirring rate is preferably 200-450 rpm.

Preferably, in step (2), the hydroxyl group-, amine group- or carboxyl group-containing water-soluble small-molecule crosslinker is one or more selected from ethylene glycol, pentaerythritol, diethanolamine, triethanolamine, hexamethoxymethyl melamine, and hexanedioic acid; the molar ratio of the hydroxyl group-, amine group- or carboxyl group-containing water-soluble small-molecule crosslinker and the organic carboxylic group-, amino group- or hydroxyl group-containing hydrophilic polymer is 0.5:10 to 1:10.

Preferably, in step (3), the mixed solution prepared in step (2) is used to prepare a lithium-ion cathode or anode slurry, and after the slurry is spread on a current collector, the crosslinker undergoes the crosslinking reaction during a drying process to obtain the binder, with a drying temperature of 90-110° C.

The present invention further protects the use of the crosslinking-type aqueous binder for lithium-ion batteries in electrochemical energy storage devices. The electrochemical energy storage devices include lithium-ion batteries, secondary batteries, supercapacitors and solar batteries.

Particularly, the crosslinking-type aqueous binder for lithium-ion batteries can be used in a lithium-ion battery cathode. The lithium-ion battery cathode comprises a current collector and a lithium-ion battery cathode slurry loaded on the current collector. The lithium-ion battery cathode slurry comprises a cathode active material, a conductive agent, and the mixed solution prepared in step (2) of the above preparation method, wherein a solids content of the lithium-ion battery cathode slurry is 30-75 wt % and a viscosity of the lithium-ion battery cathode slurry is 3000-8000 mPa·s. The lithium-ion battery cathode slurry is spread on the current collector and then dried to obtain the electrode. The cathode active material is one or more selected from lithium iron phosphate, lithium cobaltate, lithium manganate and a ternary material ($LiNi_{1/3}Mn_{1/3}Co_{1/3}O_2$, NMC). The conductive/ agent is acetylene black. The current collector is an aluminum foil. A weight ratio of the cathode active material, the conductive agent, and solute in the mixed solution prepared in step (2) of the above preparation method is 70-95:2-20:3-10.

The crosslinking-type aqueous binder for lithium-ion batteries can be used in a lithium-ion battery anode. The lithium-ion battery anode comprises a current collector and a lithium-ion battery anode slurry loaded on the current collector. The lithium-ion battery anode slurry comprises an anode active material, a conductive agent, and the mixed solution prepared in step (2) of the above preparation method, wherein a solids content of the lithium-ion battery anode slurry is 30-75 wt % and a viscosity of the lithium-ion battery anode slurry is 3000-8000 mPa·s. The lithium-ion battery anode slurry is spread on the current collector and then dried to obtain the electrode. The anode active material is one or more selected from a silicon-based material, lithium titanate and graphite. The conductive agent is acetylene black. The current collector is a copper foil. A weight ratio of the anode active material, the conductive agent, and solute in the mixed solution prepared in step (2) of the above preparation method is 70-95:2-20:3-10.

The present invention also protects a lithium-ion battery. The lithium-ion battery comprises a battery case, an electrode core and an electrolyte; the electrode core and the electrolyte are sealed in the battery case; the electrode core comprises the above electrodes and a separator between the electrodes.

The present invention has the following advantages.

(1) The crosslinking-type aqueous binder provided by the present invention can be applied in aqueous solvent. A crosslinking reaction of the slurry is initiated by incorporating a drying process of lithium-ion battery electrodes to obtain an electrode having excellent elasticity, binding strength and flexibility. The electrodes provide more active cites for contacting with the electrode active materials, greatly increases ion conduction rate in the electrolyte, facilitates electron and ion transportation during charging and discharging, and reduces the electrochemical interface impedance.

(2) Use of the crosslinking-type aqueous binder provided by the present invention in cathodes and anodes can improve uniformity and flatness in the formation of films from electrode slurry, enhance the peel strengths of the active materials and the conductive agent to a metal substrate after the drying and crosslinking, improve the binding strength between the electrode active materials, the conductive agents and the current collector, and largely improve cycling stabilities of the cathode and anode materials for lithium batteries.

(3) The preparation method of the crosslinking-type aqueous binder of the present invention is simple, convenient, and environment-friendly. The raw materials of the binder can be obtained from wide variety of sources and are low in cost. The crosslinking reaction is initiated by incorporating the drying process of lithium-ion battery electrodes, without the need of additional process or conditions. The obtained electrodes exhibit excellent binding strength, flexibility, and elasticity, which can solve the prior art problems such as poor binding strength between the electrode active materials, the conductive agents and the current collector, and deficient elasticity for preventing the lithium-ion battery from swelling and breaking off due to volume expansion and contraction during charging and discharging. Thus, the invention has broad market prospects and promotes technological advancement of the lithium-ion battery industry.

(4) The crosslinking-type aqueous binder provided by the present invention has overcome the shortcomings of the binder in CN 104356979 B including that the binder is deficient in binding strength, dispersibility and elasticity, and it is necessary to control the crosslinking degree for realizing its binding function. As the materials undergo the crosslinking reaction during the drying process of electrodes, we can obtain binders with better dispersity and higher binding strength, providing more active cites for contacting with the electrode active materials.

Figure 1:
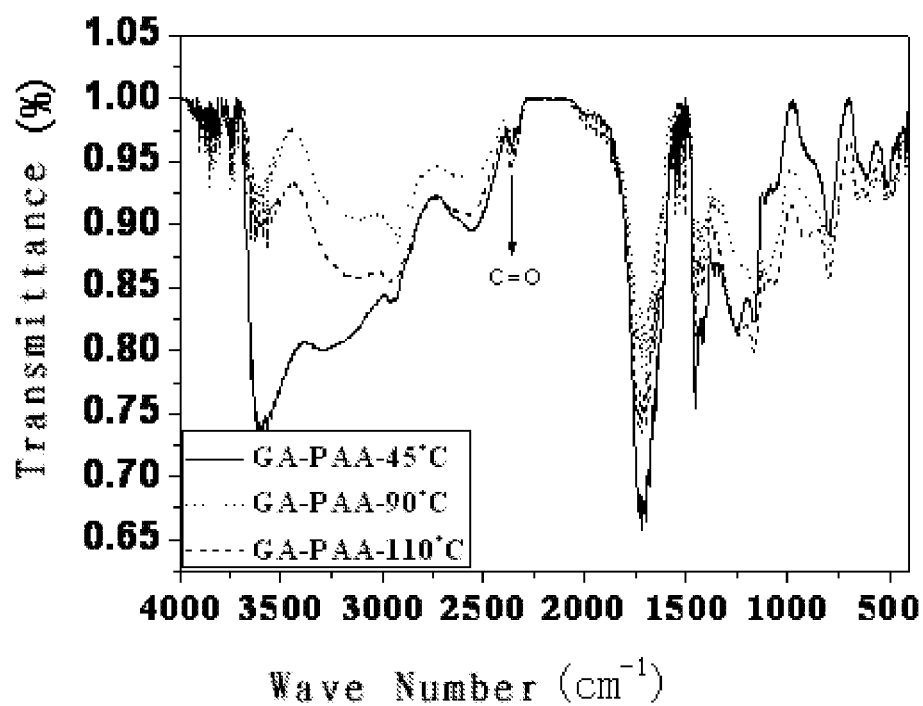
FIGS. 1 to 3 are the infrared spectra showing the crosslinking of GA-PAA with crosslinkers having hydroxyl groups, amine groups, etc, in embodiments 4 to 6.

Arabic gum is denoted as GA, polyvinyl alcohol is denoted as PVA, pentaerythritol is denoted as PER, triethanolamine is denoted as TEOA, hexamethoxymethyl melamine is denoted as HMMM, and methyl acrylate is denoted as MA.

DETAILED DESCRIPTION OF THE EMBODIMENTS

The following embodiments are intended to further illustrate the invention but not to limit the invention.

Arabic gum is denoted as GA. The organic carboxylic group-containing hydrophilic polymer prepared by a free radical graft copolymerization or a Michael addition reaction of arabic gum and acrylic acid is denoted as GA-PAA. Polyvinyl alcohol is denoted as PVA. The organic carboxylic group-containing hydrophilic prepared by a free radical graft copolymerization or a Michael addition reaction of acrylic acid and polyvinyl alcohol is denoted as PVA-PAA. The organic carboxylic group-containing hydrophilic polymer prepared by a free radical graft copolymerization or a Michael addition reaction of methyl acrylate, acrylic acid and polyvinyl alcohol is denoted as PVA-PAA-MA. Pentaerythritol is denoted as PER. Triethanolamine is denoted as TEOA. Hexamethoxymethyl melamine is denoted as HMMM. Methyl acrylate is denoted as MA.

Taking PVA-PAA as an example, the preparation method is as follows: Adding PVA into a two-neck flask, followed by the addition of DI-water. Under an argon gas atmosphere, stirring the mixture until PVA is completely dissolved, then raising the temperature to 65° C., and sequentially adding a solution of Na2S2O8 and NaHSO3 and acrylic acid. The materials in the solution undergo a reaction at 65° C. under the argon gas atmosphere for 48 hours, so as to obtain the hydrophilic polymer PVA-PAA. An amount of the initiator is 0.01-5 wt % of a total mass of the monomer.

Taking hydroxyl group-containing GA and carboxyl group-containing GA-PAA modified with acrylic acid as the examples, hydroxyl group- containing GA is crosslinked by esterification with the carboxyl group-containing water-soluble small-molecule crosslinker, which is illustrated by the following equation:

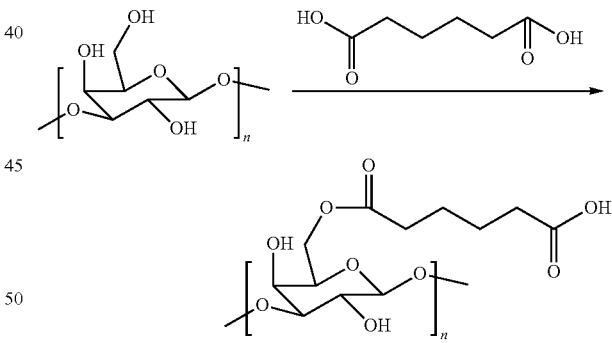

Carboxyl group-containing GA-PAA modified by acrylic acid is crosslinked by esterification with the hydroxyl group-containing water-soluble small-molecule crosslinker, which is illustrated by the following equation:

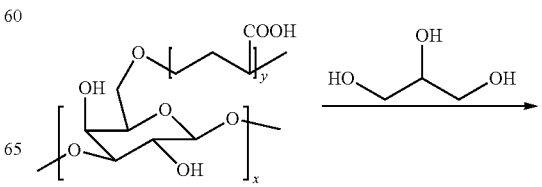

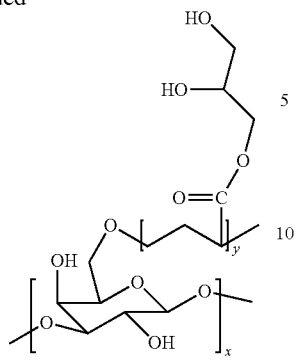

Embodiment 1

Solubility Test of GA-PAA Crosslinked With Hydroxyl Group-Containing Small-Molecule Crosslinker (1) First, 1 g of GA-PAA (a molecular weight of 400000-1000000) was pre-dissolved in 10 ml of deionized water (DI-Water), thoroughly stirred under an argon gas atmosphere for 0.5-2.5 hours to remove oxygen and obtain a uniform and well-dispersed solution; the stirring rate was 100-500 rpm.

(2) One or more of ethylene glycol, glycerol and pentaerythritol (OH:GA-PAA=1:10, molar ratio) was added into the solution obtained in step (1), thoroughly stirred to obtain a mixed solution. The solution was then placed in a vacuum to allow esterification at 45° C., 90° C. or 110° C. for 1-24 hours. The products were dissolved in a certain mass of water for observations on their solubilities.

Embodiment 2

Embodiment 2 was similar to embodiment 1 but different in step (2): an amine group-containing small-molecule crosslinker such as triethanolamine was added into the solution obtained in step (1); after amidation under various temperatures, observations on the products' solubilities were performed.

Embodiment 3

Embodiment 3 was similar to embodiment 1 but different in step (2): a crosslinker hexamethoxymethyl melamine (hmmm) was added into the solution obtained in step (1); after esterification under various temperatures, observations on the products' solubilities were performed.

As can be concluded from embodiments 1 to 3, GA-PAA could be completely dissolved at 45-90° C., but would undergo crosslinking above 110° C. where swelling was observed. The GA-PAA system added with pentaerythritol (PER), triethanolamine (TEOA) or hexamethoxymethyl melamine (hmmm) could be completely dissolved at 45° C., but would undergo crosslinking above 90° C. where swelling was observed.

Embodiment 4

(1) First, 1 g of GA-PAA (a molecular weight of 400000-1000000) was pre-dissolved in 10 ml of deionized water (DI-Water), thoroughly stirred under an argon gas atmosphere for 0.5-2.5 hours to remove oxygen and obtain a uniform and well-dispersed solution; the stirring rate was 100-500 rpm.

(2) One or more of ethylene glycol, glycerol and pentaerythritol (OH:GA-PAA=1:10, molar ratio) was added into the solution obtained in step (1), thoroughly stirred to obtain a mixed solution. The solution was then placed in a vacuum to allow esterification at 45° C., 90° C. or 110° C. for 24 hours. See FIG. 1 for the infrared spectrum.

Embodiment 5

Embodiment 5 was similar to embodiment 4 but different in step (2): an amine group-containing small-molecule crosslinker such as triethanolamine was added into the solution obtained in step (1). See FIG. 2 for the infrared spectrum.

Embodiment 6

Embodiment 6 was similar to embodiment 4 but different in step (2): a crosslinker hexamethoxymethyl melamine (hmmm) was added into the solution obtained in step (1), and the solution was treated under various temperatures. See FIG. 3 for the infrared spectrum.

Figure 2:
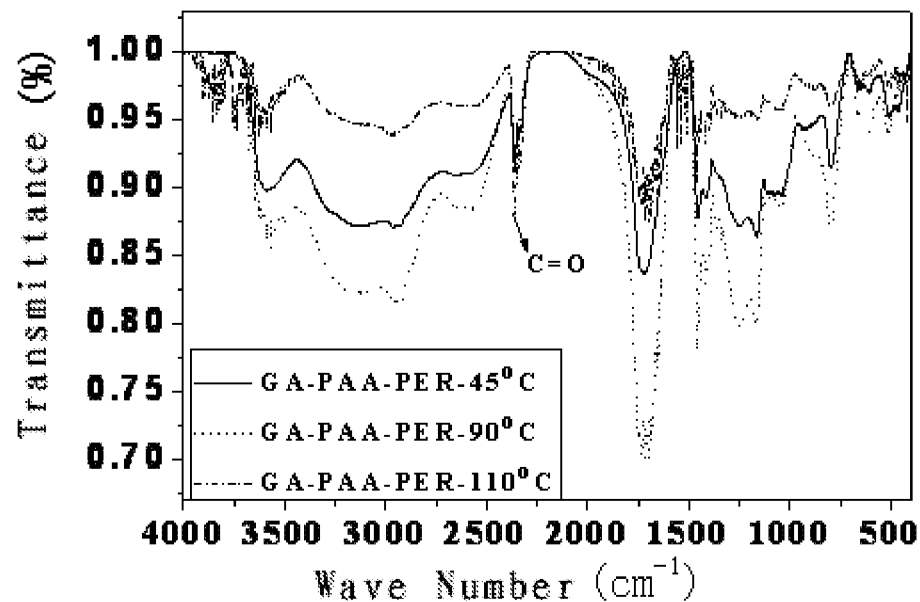
Figure 3:
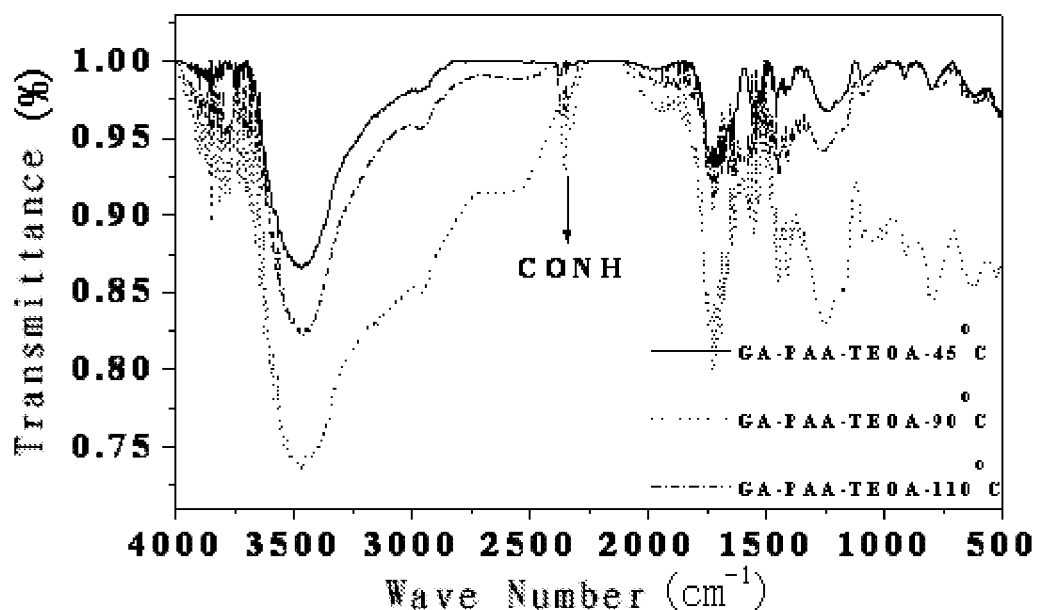

As can be concluded from FIG. 1 to FIG. 3, a crosslinking reaction of GA-PAA with pentaerythritol (PER), triethanolamine (TEOA) or hexamethoxymethyl melamine (hmmm) would occur above 110° C.

Embodiment 7

(1) First, 1 g of GA-PAA (a molecular weight of 400000-1000000) was pre-dissolved in 10 ml of deionized water (DI-Water), thoroughly stirred under an argon gas atmosphere for 0.5-2.5 hours to remove oxygen and obtain a uniform and well-dispersed solution; the stirring rate was 100-500 rpm.

(2) One or more of ethylene glycol, glycerol and pentaerythritol (OH:GA-PAA=1:10, molar ratio) was added into the solution obtained in step (1), thoroughly stirred to obtain a mixed solution. The solution was then placed in a vacuum to allow esterification at 45° C. for 24 hours. See FIG. 4 for the DSC analysis of the interaction between GA-PAA and hydroxyl group-containing crosslinkers.

Embodiment 8

Embodiment 8 was similar to embodiment 7 but different in step (2): an amine group-containing small-molecule crosslinker such as triethanolamine was added into the solution obtained in step (1). See FIG. 4 for the DSC analysis of the interaction between GA-PAA and amine group-containing crosslinkers.

Embodiment 9

Embodiment 9 was similar to embodiment 7 but different in that: a methoxyl group-containing crosslinker such as hexamethoxymethyl melamine was added into the solution obtained in step (1). See FIG. 4 for the DSC analysis of the interaction between GA-PAA and methoxyl group-containing crosslinkers.

Figure 4:
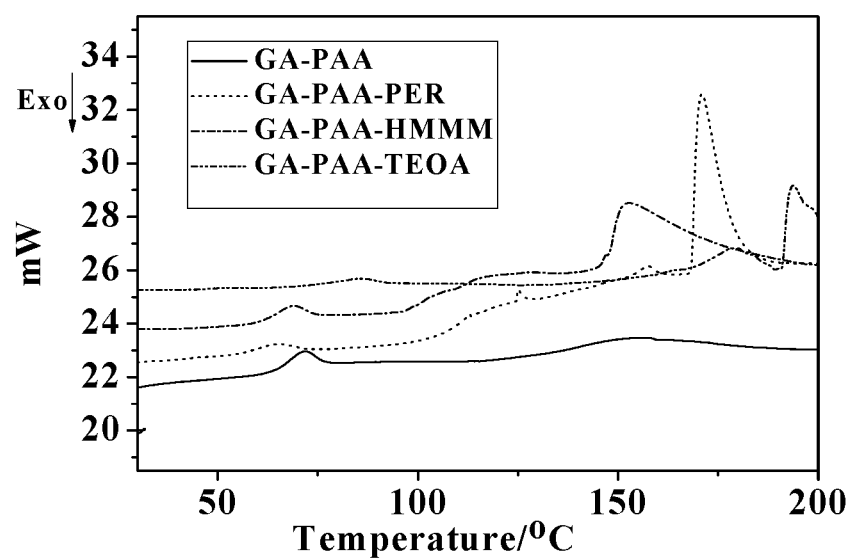
FIG. 4 shows the DSC analysis of the interaction between GA-PAA and crosslinkers having hydroxyl groups, amine groups, etc, in embodiments 7 to 9.

As can be concluded from FIG. 4, an endothermic crosslinking reaction of GA-PAA with pentaerythritol (PER), triethanolamine (TEOA) or hexamethoxymethyl melamine (hmmm) would occur above 90° C.

Embodiment 10

Peel Strength Experiment of the Crosslinking-Type Binder (1) First, 1 g of polyethyleneimine (PEI, a molecular weight of 70000) was pre-dissolved in 10 ml of deionized water (DI-Water), thoroughly stirred under an argon gas atmosphere for 0.5-2.5 hours to remove oxygen and obtain a uniform and well-dispersed solution; the stirring rate was 100-500 rpm.

(2) One or more of propanedioic acid, tricarballylic acid and hexanedioic acid was added into the solution obtained in step (1), thoroughly stirred to obtain a mixed solution. The solution was then placed in a vacuum to allow reaction at 45° C. or 90° C. for 1-24 hours. The products were dissolved in a certain mass of water for observations on their solubilities. It was observed that, after heated at 90° C., PEI underwent a crosslinking reaction with the above various crosslinkers.

(3) The mixed binders obtained in step (2) were spread on aluminum foils with a thickness of 100 μm, and subjected to force-air drying at 110° C. The peel strengths of the binders were measured and determined to be 0.08 N/mm.

Embodiment 11

Embodiment 11 was similar to embodiment 10 but different in that: in step (1), polyethyleneimine was replaced with polyvinyl alcohol (PVA), a hydroxyl group-containing hydrophilic polymer; in step (2), the solution was placed in a vacuum to allow reaction at 45° C. or 110° C. for 1-24 hours for later observations on solubilities. It was observed that, after heated at 110° C., PVA underwent a crosslinking reaction with the above various crosslinkers. The mixed binders obtained in step (2) were spread on aluminum foils with a thickness of 100 μm, and subjected to force-air drying at 110° C. The peel strengths of the binders were measured and determined to be 0.10 N/mm.

Embodiment 12

Embodiment 12 was similar to embodiment 1 but different in that: in step (1), GA-PAA was replaced with PVA-PAA; in step (2), the crosslinker was pentaerythritol (PER), triethanolamine (TEOA) or hexamethoxymethyl melamine (hmmm). Observations on the products' solubilities were performed.

Embodiment 13

Embodiment 13 was similar to embodiment 12 but different in that: in step (1), PVA-PAA was replaced with PVA-PAA-MA. Observations on the products' solubilities were performed.

Embodiment 14

Figure 5:
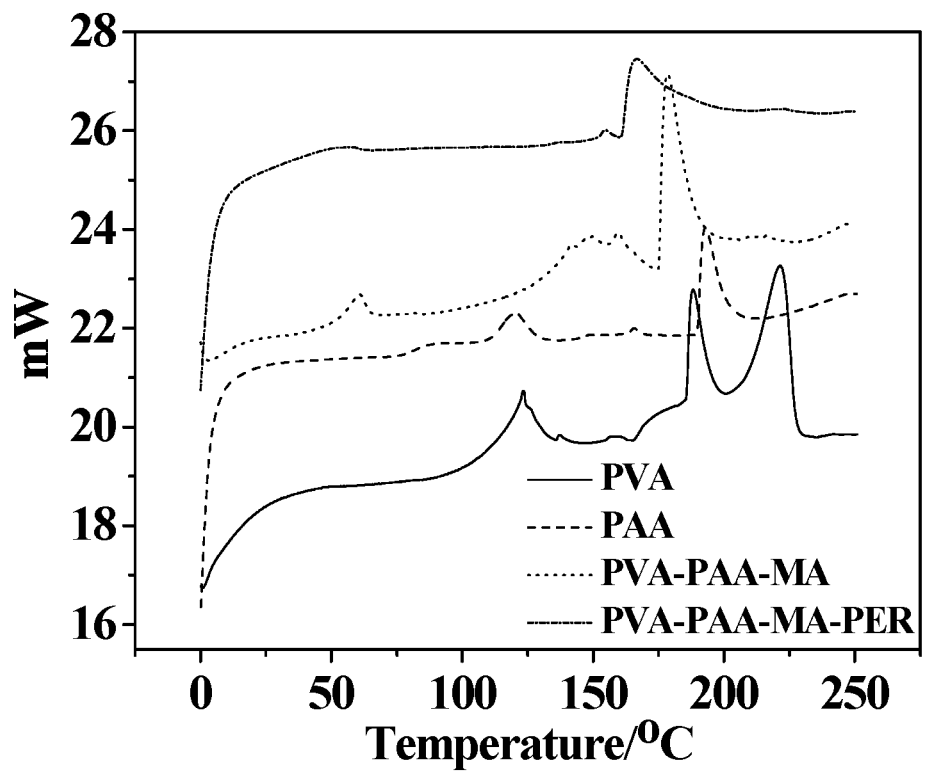
FIG. 5 shows the DSC analysis showing the crosslinking of PVA-PAA-MA with crosslinkers having hydroxyl groups, amine groups, etc, in embodiment 14.

Embodiment 14 was similar to embodiment 5 but different in that: in step (1), the substrate was PVA-PAA-MA. See FIG. 5 for the DSC analysis. As can be concluded from FIG. 5, PVA-PAA-MAA underwent an endothermic crosslinking reaction with pentaerythritol (PER) above 90° C.

Embodiment 15

Preparation of Electrodes

The lithium-ion battery anode comprised a current collector and a lithium-ion battery anode slurry loaded on the current collector. The lithium-ion battery anode slurry comprised an anode active material, a conductive agent, and a binder. A weight ratio of the anode active material, the conductive agent and the binder was 70:20:10. The solvent was water. The anode active material was silicon. The conductive agent was acetylene black. The current collector was a copper foil current collector. A solids content of the lithium-ion battery anode slurry was 30% and a viscosity of the lithium-ion battery anode slurry was 3000 mPa·s. The peel strengths of the prepared GA-PAA-Si anodes were as shown in Table 1. As can be seen from the table, the silicon electrodes obtained by crosslinking with various crosslinkers showed relatively high peel strengths, wherein the GA-PAA-HMMM-Si electrode had the highest peel strength of up to 0.28 N/mm.

TABLE 1

| Electrode | Peel strength (N/mm) |
| --- | --- |
| GA-PAA-Si | 0.18 |
| GA-PAA-PER-Si | 0.2 |
| GA-PAA-HMMM-Si | 0.28 |
| GA-PAA-TEOA-Si | 0.19 |

Embodiment 16

1. Preparation of Test Electrode

As one embodiment of the lithium-ion battery anode of the present invention, the electrode comprised a current collector and a lithium-ion battery anode slurry loaded on the current collector. The lithium-ion battery anode slurry comprised an anode active material, a conductive agent, and a binder. A weight ratio of the anode active material, the conductive agent and the binder was 70:20:10. The solvent was water. The anode active material was silicon. The conductive agent was acetylene black. The current collector was a copper foil current collector. A solids content of the lithium-ion battery anode slurry was 75% and a viscosity of the lithium-ion battery anode slurry was 8000 mPa·s.

GA-PAA, as the starting material of the aqueous binder, was dissolved in deionized water, and thoroughly stirred under an argon gas atmosphere for 0.5-2.5 hours to remove oxygen and obtain a uniform and well-dispersed solution. Then, any one of pentaerythritol (PER), triethanolamine (TEOA) and hexamethoxymethyl melamine (hmmm) was added into the solution and thoroughly stirred, wherein a molar ratio of GA-PAA and the water-soluble small-molecule crosslinker was 10:1. Silicon and the conductive agent were mixed and stirred to a uniform mixture which was then added to the above system, an appropriate amount of water was added to adjust the viscosity, and thereby the electrode slurry was obtained. The slurry was evenly spread over the copper foil, and vacuum-dried at 110° C. to initiate a crosslinking reaction, so as to obtain a silicon anode. The vacuum-dried electrode was weighed and installed into a 2025 battery case in a glove box, with a lithium sheet as the counter electrode, a polyethylene film as the separator and 1

M LiPF6 EC/DMC/DEC (v/v/v=1/1) as the electrolyte, to assemble a battery which was then subjected to a constant current charge-discharge test.

2. Electrochemical Test

A constant current charge-discharge test was performed on the test electrodes to determine their electrochemical performance and electrochemical impedances.

4. Results Analysis

Figure 6:
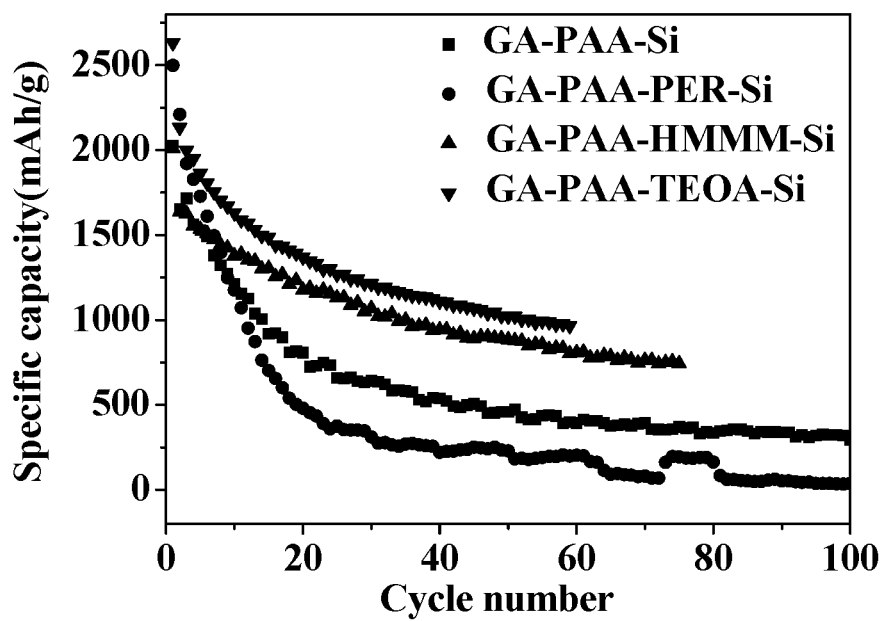
FIG. 6 shows the cycling-performance test where GA-PAA binders crosslinked by crosslinkers having hydroxyl groups, amine groups, etc, were applied to a silicon anode active material in embodiment 16.

FIG. 6 shows the cycling-performance test curves of the silicone electrodes of the present embodiment at 400 mA/g. As can be seen from the figure, the GA-PAA-TEOA-Si and GA-PAA-HMMM-Si anodes, which were prepared with the three-dimensional crosslinking-type polymer binders, had shown excellent cycling performances. After 60 charging-discharging cycles, the electrodes still exhibited a charging specific capacity above 1000 mAh/g, far higher than that of the GA-PAA-Si electrode under the same condition, indicating that they had excellent cycling performance and electrochemical stability. In summary, the addition of crosslinker could largely improve the cyclic stability of silicon electrode.

Figure 7:
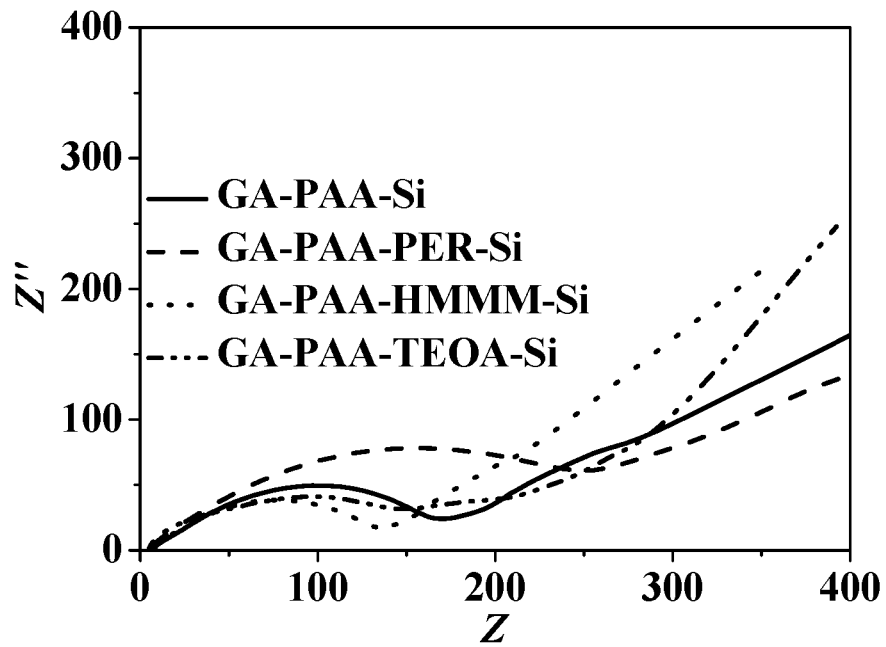
FIG. 7 shows electrochemical-impedance curves of the silicon anodes and the comparative electrode in embodiment 16.

FIG. 7 shows the electrochemical impedance curves of the silicon anodes and the comparative electrode. As can be seen from the figure, after 60 charging-discharging cycles, the GA-PAA-TEOA-Si and GA-PAA-HMMM-Si anodes, which were prepared with three-dimensional crosslinking-type polymer binders, exhibited an electrochemical impedance lower than that of the GA-PAA-Si electrode under the same condition. In summary, the addition of crosslinkers TEOA and HMMM could reduce the electrochemical impedance of silicon electrode.

Embodiment 17

1. Preparation of Test Electrode

The lithium-ion battery cathode comprised a current collector and a lithium-ion battery cathode slurry loaded on the current collector. The lithium-ion battery cathode slurry comprised a cathode active material, a conductive agent, and a binder. A weight ratio of the cathode active material, the conductive agent and the binder was 95:2:3. The solvent was water. The cathode active material was LFP. The conductive agent was acetylene black. The current collector was an aluminum foil current collector. A solids content of the lithium-ion battery cathode slurry was 50% and a viscosity of the lithium-ion battery cathode slurry was 5000 mPa·s.

GA-PAA, as the starting material of the aqueous binder, was dissolved in deionized water, and thoroughly stirred under an argon gas atmosphere for 0.5-2.5 hours to remove oxygen and obtain a uniform and well-dispersed solution. Then, any one of pentaerythritol (PER), triethanolamine (TEOA) and hexamethoxymethyl melamine (hmmm) was added into the solution and thoroughly stirred, wherein a molar ratio of GA-PAA and the water-soluble small-molecule crosslinker was 10:0.1. LFP and the conductive agent were mixed and stirred to a uniform mixture which was then added to the above system, an appropriate amount of water was added to adjust the viscosity, and thereby the LFP electrode slurry was obtained. The slurry was evenly spread over the aluminum foil, and vacuum-dried at 110° C. to initiate a crosslinking reaction, so as to obtain an LFP electrode. The vacuum-dried electrode was weighed and installed into a 2025 battery case in a glove box, with a lithium sheet as the counter electrode, a polyethylene film as the separator and 1 M LiPF6 EC/DMC/DEC (v/v/v=1/1) as the electrolyte, to assemble a battery which was then subjected to a constant current charge-discharge test.

2. Preparation of Comparative Electrode

A comparative electrode was prepared by the same method with GA-PAA as the binder.

3. Electrochemical Test

A test was performed on the test electrodes and the comparative electrode to determine their electrochemical performance and electrochemical impedances.

4. Results Analysis

Figure 8:
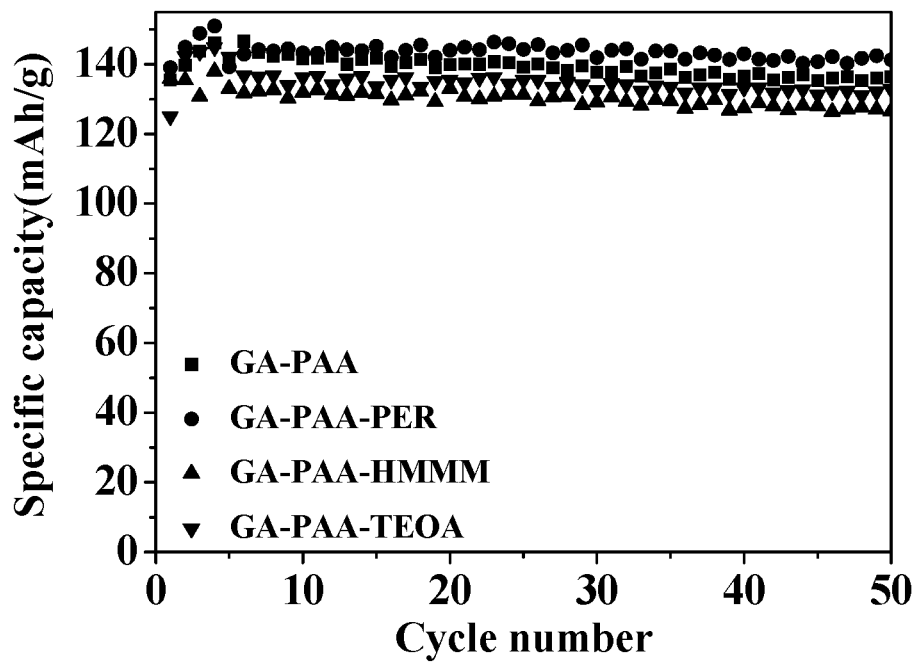
FIG. 8 shows the cycling-performance test where GA-PAA binders crosslinked by crosslinkers having hydroxyl groups, amine groups, etc, were applied to an LFP cathode active material in embodiment 17.

FIG. 8 shows the cycling-performance test curves of the LFP electrodes and the comparative electrode of the present embodiment at a charging and discharging current density of 0.5 C. The LFP electrodes, which were prepared with the three-dimensional crosslinking-type GA-PAA polymer binders, had shown excellent cyclic stability. Compared with the GA-PAA-LFP electrode, the GA-PAA-PER-LFP electrode exhibited a higher specific capacity. After 50 charging-discharging cycles, the specific capacities of the GA-PAA-LFP, GA-PAA-PER-LFP, GA-PAA-HMMM-LFP and GA-PAA-TEOA-LFP electrodes were respectively 135.6, 142.9, 127 and 132 mAh/g. In summary, the addition of crosslinker PER could improve the specific capacity and cyclic stability of LFP electrode.

Figure 9:
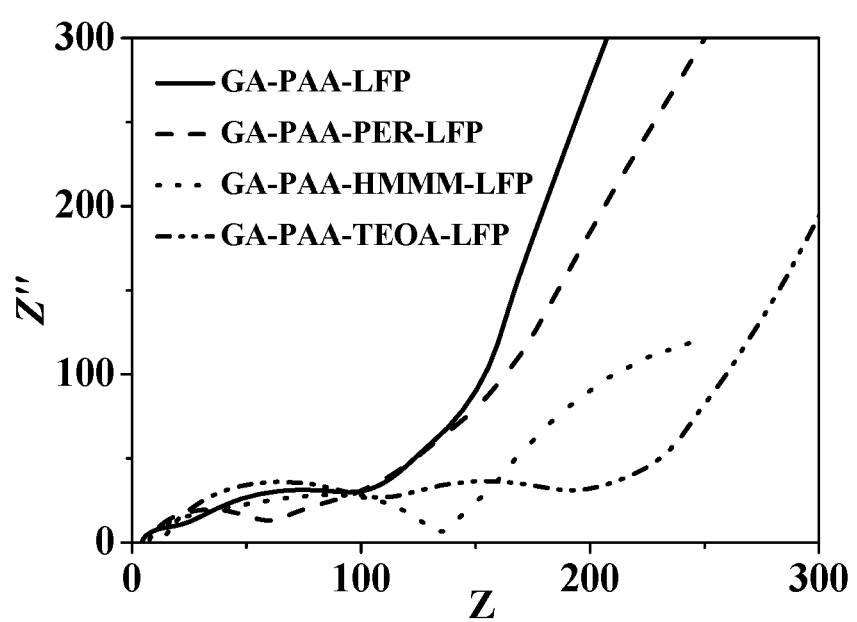
FIG. 9 shows electrochemical-impedance curves of the lithium iron phosphate electrodes and the comparative electrode in embodiment 17.

FIG. 9 shows the electrochemical-impedance curves of the LFP electrodes and the comparative electrode. As can be seen from the figure, compared with the GA-PAA-LFP electrode, the GA-PAA-PER-LFP electrode exhibited a lower electrochemical impedance after 50 charging-discharging cycles, indicating that the addition of crosslinker PER could improve the electrochemical performance of LFP electrode.

What is claimed is:

1. A crosslinking-type aqueous binder for lithium-ion batteries, comprising: an organic carboxylic group-, amino group- or hydroxyl group-containing hydrophilic polymer, and a hydroxyl group-, amine group- or carboxyl group-containing water-soluble small-molecule crosslinker, wherein the organic carboxylic group-, amino group- or hydroxyl group-containing hydrophilic polymer has a molecular weight of 70000-1000000; the organic carboxylic group-containing hydrophilic polymer is prepared through a free radical graft copolymerization or a Michael addition reaction of an acrylic monomer and the hydroxyl group-containing hydrophilic polymer; the hydroxyl group-containing hydrophilic polymer is one or more selected from the group consisting of arabic gum, cyclodextrin, cellulose derivatives, xanthan gum, pectin, gelatin, starch, sesbania gum, polyvinyl alcohol, polyethylene glycol and polyhydroxy polybutadiene; the amino group-containing hydrophilic polymer is one or more selected from the group consisting of arabic gum, chitosan and its derivatives, linear polyethyleneimine and branched polyethyleneimine; a method of preparing the crosslinking-type aqueous binder comprises the following steps:

(1) dissolving the organic carboxylic group-, amino group- or hydroxyl group-containing hydrophilic polymer in deionized water, and stirring under a protective gas atmosphere for 0.5-2.5 hours to remove oxygen and obtain a solution;

(2) adding the hydroxyl group-, amine group- or carboxyl group-containing water-soluble small-molecule crosslinker to the solution prepared in the step (1), stirring to obtain the crosslinking-type aqueous binder; wherein a molar ratio of the hydroxyl group-, amine group- or carboxyl group-containing water-soluble small-molecule crosslinker and the organic carboxylic group-, amino group-or hydroxyl group-containing hydrophilic polymer is 0.01:10 to 1:10;

wherein the hydroxyl group-containing water-soluble small-molecule crosslinker is at least one monomer selected from the group consisting of a saturated diol having a carbon number more than or equal to 2, a saturated polyol having a carbon number more than or equal to 3, a saturated dihydroxyalkylamine NH—$(C_mH_{2m}—OH)_2$, and a saturated polyhydroxyalkylamine N—$(C_mH_{2m}—OH)_3$, wherein m≥1 and m'≥1; the amine group-containing water-soluble small-molecule crosslinker is at least one monomer selected from the group consisting a saturated diamine $C_nH_{2n}(NH_2)_2$ and a saturated polyamine $C_{n'}H_{2n'+2-x}(NH_2)_n$, wherein n≥2, n'≥3, x ≥3; the carboxyl group-containing water-soluble small-molecule crosslinker is at least one monomer selected from the group consisting of a saturated diacid, and a saturated polyacid having a carbon number more than or equal to 3.

2. The crosslinking-type aqueous binder according to claim 1, wherein, in the step (1), the protective gas atmosphere is nitrogen gas and/or argon gas, and the a stirring rate is 100-500 rpm; in the step (2), the molar ratio of the hydroxyl group-, amine group- or carboxyl group-containing water-soluble small-molecule crosslinker and the organic carboxylic group-, amino group- or hydroxyl group-containing hydrophilic polymer is 0.5:10 to 1:10.

3. A crosslinking-type aqueous binder for lithium-ion batteries, comprising: an organic carboxylic group-, amino group- or hydroxyl group-containing hydrophilic polymer, and a hydroxyl group-, amine group-or carboxyl group-containing water-soluble small-molecule crosslinker, wherein the organic carboxylic group-, amino group- or hydroxyl group-containing hydrophilic polymer has a molecular weight of 70000-1000000; the organic carboxylic group-containing hydrophilic polymer is prepared through a free radical graft copolymerization or a Michael addition reaction of an acrylic monomer and the hydroxyl group-containing hydrophilic polymer; the hydroxyl group-containing hydrophilic polymer is one or more selected from the group consisting of arabic gum, cyclodextrin, cellulose derivatives, xanthan gum, pectin, gelatin, starch, sesbania gum, polyvinyl alcohol, polyethylene glycol and polyhydroxy polybutadiene; the amino group-containing hydrophilic polymer is one or more selected from the group consisting of arabic gum, chitosan and its derivatives, linear polyethyleneimine and branched polyethyleneimine; a method of preparing the crosslinking-type aqueous binder comprises the following steps:

(1) dissolving the organic carboxylic group-, amino group- or hydroxyl group-containing hydrophilic polymer in deionized water, and stirring under a protective gas atmosphere for 0.5-2.5 hours to remove oxygen and obtain a solution;

(2) adding the hydroxyl group-, amine group- or carboxyl group-containing water-soluble small-molecule crosslinker to the solution prepared in the step (1), stirring to obtain the crosslinking-type aqueous binder; wherein a molar ratio of the hydroxyl group-, amine group- or carboxyl group-containing water-soluble small-molecule crosslinker and the organic carboxylic group-, amino group- or hydroxyl group-containing hydrophilic polymer is 0.01:10 to 1:10;

wherein, the hydroxyl group-, amine group- or carboxyl group-containing water-soluble small-molecule crosslinker is at least one selected from the group consisting of ethylene glycol, glycerol, pentaerythritol, diethanolamine, triethanolamine, hexamethoxymethyl melamine, hexanedioic acid, propanedioic acid, and tricarballylic acid.

* * * * *